April 19, 1960
A. GEESE ET AL
2,933,660
ELECTRICAL DEVICE COMPRISING SUBDIVIDED
SPOOL CONTAINING OPERATING PARTS
Filed March 18, 1958
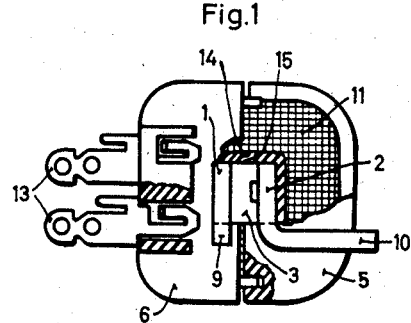
Fig.1
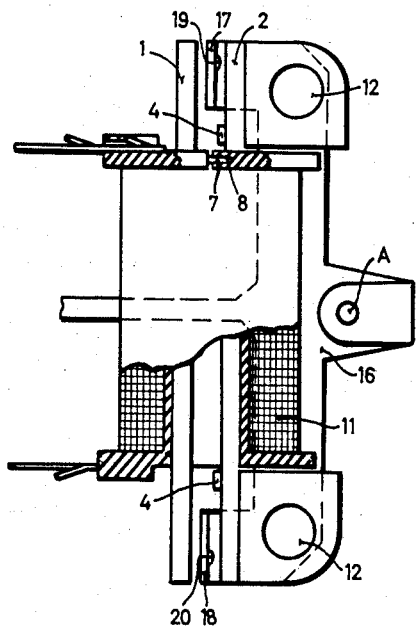
Fig.2
Inventors:
Albert Geese,
Herbert Hüttisch,

# 2,933,660

ELECTRICAL DEVICE COMPRISING SUBDIVIDED SPOOL CONTAINING OPERATING PARTS

Albert Geese and Herbert Hüttisch, Munich, Germany, assignors to Siemens & Halske Aktiengesellschaft, Berlin and Munich, Germany, a corporation of Germany Application March 18, 1958, Serial No. 722,185

Claims priority, application Germany March 22, 1957

10 Claims. (Cl. 317—165)

This invention is concerned with an electrical device comprising a spool for receiving a coil winding, and having structural parts disposed interiorly thereof, as is, for example, the case in connection with known embodiments of ringers or buzzers.

These known structures require extensive assembling operations for arranging the structural parts inside the coil body because such parts, in accordance with their functions, must assume mutually accurate positions. For example, the end disks of the spool, which may be made of non-magnetic material, may be pushed upon the structural parts, pressing such parts in position, whereupon the ends disks are secured by notching or the like.

The purpose of the invention is to simplify assembling operations by the provision of a longitudinally subdivided spool body, in the interior space of which the structural parts are disposed and held in position with the spool parts by the coil winding placed thereon.

The longitudinal subdivision or splitting of the spool body and securing of the corresponding parts by the winding placed thereon is known. It is further known to place such a subdivided spool body upon a core and to secure it in position by the coil winding.

In accordance with the invention, not only the parts of the spool body, but all structural or operational parts arranged inside thereof, are secured in position by the coil winding. The simplification thereby achieved in connection with the assembling operations of the individual parts is believed to be obvious. It is merely necessary to insert these parts between the members which are to form the spool and to process the resulting assembly in a winding device which provides the coil winding. The winding alone effects holding the structural parts in assembled position.

In accordance with another object and feature of the invention, the structural parts may be secured against longitudinal displacement by means of extensions or projections which may also be advantageously utilized for the mounting of the completely assembled unit.

In the assembling of the individual parts, according to the invention, the parts of the spool body must, of course, not abut. However, in order to prevent positioning of the winding across the intervening space between the parts of the spool body directly opposite the inserted structural or operational members, there are provided, in accordance with the invention, at the dividing lines of the spool body, extensions of a width less than the wall thickness, such that these extensions overlap upon assembly of the parts without, however, coming into engagement. This sealing of the intervening space prevents arcing from the winding to the inserted structural parts and is important because the wall thickness of the spool body, for technical reasons connected with the winding, must be as small as possible, resulting in slight radial spacing of the innermost winding layer from the inserted structural parts. These extensions are, of course, not required along the dividing lines of the disks at the ends of the spool.

The assembly of the individual parts, according to the invention also results, as compared with known procedures, in advantages so far as the mounting of the complete unit in a holding or mounting device is concerned. The shape of the parts lying outside of the spool body may be as desired, and these parts may, therefore, be formed so as to provide for adjustable mounting.

The various objects and features of the invention will appear from the description which will be rendered below with reference to the accompanying drawing showing, as an example, an embodiment of a ringer comprising three structural or operational parts disposed interiorly of the spool body.

Fig. 1 is a part sectional view of a ringer as seen from the top; and

Fig. 2 is a part sectional view of the ringer as seen from the side.

The structural parts comprise a permanent magnet 3 to which are connected two yokes 1 and 2, the free ends of the yokes extending from the spool body. These structural parts are inserted between two parts 5 and 6 of a spool body, made of insulating material, and are held in position by the coil winding 11.

The permanent magnet 3 is secured against longitudinal displacement by means of the protuberances or projections 4. The yokes are secured against longitudinal displacement by means of projections or extensions 9 and 10, provided at the free ends thereof. The extensions 10 of the yoke 2 are bent at right angles and provided with holes 12, thus adapting these extensions for the mounting of the complete unit.

The portion 6 of the spool body is provided, along the dividing line of the spool disks, with ears 7 which enter into notches 8 formed in the portion 5, thus cooperatively securing the portions of the spool body. The end disks of the spool portion 6 are provided with pockets for receiving soldering tabs in plug-in cooperation therewith. Mutually overlapping extensions 14, 15 seal the space between the two portions of the spool body which is required for the functioning of the structure.

The armature belonging to the illustrated structure is shown in Fig. 2 at 16. The armature is rotatable about the axis A and is provided with extensions 17, 18 which project into the spaces between the yokes 1 and 2, non-magnetic rivets 19, 20 being carried by these extensions to prevent engagement of the armature with the yoke 1 incident to displacement thereof. The force exerted by the armature extensions is accordingly transmitted only to the yoke 2 which is fixedly mounted in a holding device and does not act opposite to the force produced by the winding in holding the parts together.

It has been found that the force produced by the winding in holding the parts together is sufficient even when the armature is operated to establish engagement with both yokes; the above described feature, therefore, is to be considered as contributing to reliable operation.

It is, within the scope of the invention possible, and may be desirable in many situations, to construct a spool wtih two portions of different size. Different parts and a different number of parts, for similar or different purposes, may likewise be provided inside of the spool body.

Changes may be made within the scope and spirit of the appended claims.

We claim:

1. An electrical device having a spool body comprising two portions placed together along longitudinally extending lines of division, operational parts disposed within said spool body, and a coil winding placed upon said spool body, said coil winding being effective to hold said spool portions together and, through the latter, clamp said operational parts in mutually cooperating positions.

2. A structure and cooperation of parts according to claim 1, comprising extensions carried by said spool portions along the longitudinally directed edges thereof, and extensions mutually overlapping to seal the space between said edges.

3. A structure and cooperation of parts according to claim 1, comprising means carried by said spool portions for determining the mutual position thereof.

4. A structure and cooperation of parts according to claim 3, comprising a permanent magnet disposed within said spool body, and two yokes in engagement with said permanent magnet, portions of said yokes extending from said spool body.

5. A structure and cooperation of parts according to claim 4, comprising extensions carried by one of said yokes for securing said permanent magnet against longitudinal displacement.

6. A structure and cooperation of parts according to claim 4, comprising an extension respectively carried by said yokes at the outer ends thereof for engagement with end disks placed upon said spool body.

7. A structure and cooperation of parts according to claim 5, comprising further extensions carried by each yoke at the outer end thereof for engagement with end disks placed upon said spool body.

8. A structure and cooperation of parts according to claim 6, wherein the extensions of one of said yokes extend at a right angle therefrom and serving as mounting means for said device.

9. A structure and cooperation of parts according to claim 7, wherein the extensions of one of said yokes extend at a right angle therefrom and serving as mounting means for said device.

10. A structure and cooperation of parts according to claim 8, comprising an armature having parts projecting respectively into spaces between said yokes, said parts having extensions at the sides facing one of said yokes for mounting the device and having protuberances for preventing engagement with the other yoke.

References Cited in the file of this patent

UNITED STATES PATENTS

| 2,565,331 | Torsch | Aug. 21, 1951 |
| 2,767,279 | Hall | Oct. 16, 1956 |

FOREIGN PATENTS

| 781,687 | Great Britain | Aug. 21, 1957 |